United States Patent [19]

Kawase

[11] Patent Number: 4,898,395
[45] Date of Patent: Feb. 6, 1990

[54] DEVICE FOR SEALING REFUELING OPENING

[75] Inventor: Ritsuo Kawase, Shizuoka, Japan

[73] Assignee: NOK Corporation, Tokyo, Japan

[21] Appl. No.: 268,733

[22] Filed: Nov. 8, 1988

[30] Foreign Application Priority Data

Nov. 12, 1987 [JP] Japan .............................. 62-173105[U]

[51] Int. Cl.<sup>4</sup> ............................................... F16J 15/00
[52] U.S. Cl. .................................. 277/207 A; 277/205; 220/85 F; 220/86 R; 141/312
[58] Field of Search ........... 277/208, 135, 227, 207 A, 277/205; 220/86 R, 85 F; 384/473, 469, 136; 141/312, 368, 370

[56] References Cited

U.S. PATENT DOCUMENTS

| 2,545,233 | 3/1951 | Kaufman | 141/368 |
| 2,576,192 | 11/1951 | Poznik | 220/86 R |
| 2,951,721 | 9/1960 | Asp | 277/205 |
| 3,903,942 | 9/1975 | Vest | 141/312 |
| 4,209,179 | 6/1980 | Tolliver | 277/205 |
| 4,501,374 | 2/1985 | Robertson | 220/86 R |
| 4,630,749 | 12/1986 | Armstrong et al. | 220/86 R |
| 4,702,386 | 10/1987 | Boehmer et al. | 220/85 F |

Primary Examiner—William A. Cuchlinski, Jr.
Assistant Examiner—Jeffrey J. Hohenshell
Attorney, Agent, or Firm—Oliff & Berridge

[57] ABSTRACT

A device for sealing a refueling opening has an elastic sealing member. The elastic member seals the gap between a tubular casing disposed in a refueling pipe and a refueling nozzle inserted into the casing during a refueling operation. The elastic sealing member is disposed within a seal supporting member mounted within the casing. The elastic sealing member is loaded with liquid-oil-containing porous particles mixed therein, and allows part of the liquid oil contained in the porous particles to exude to the surface of the sealing member.

4 Claims, 3 Drawing Sheets

DEVICE FOR SEALING REFUELING OPENING

BACKGROUND OF THE INVENTION

The present invention relates to a device for sealing a refueling opening and, more particularly, to a device of this kind that is capable of preventing any leakage of substance to be refueled and vapor of the substance, of reducing burden incurred during the insertion and removal of refueling nozzles of various types, and of exhibiting an improved level of wear resistance.

A refueling opening of a fuel tank installed in a vehicle is, in general, provided with a refueling opening sealing device for the purpose of preventing substance to be refueled from evaporating and thus dispersing into the air during a refueling operation. Such a device is shown in FIGS. 3 and 4.

The device for sealing the refueling opening is provided at an inlet portion 32 of a refueling pipe 31 connected to a fuel tank of the vehicle, not shown, to seal the gap between the refueling pipe inlet portion 32 and a refueling nozzle 33. The device comprises a casing 36 fixed to the refueling pipe inlet portion 32, and a seal supporting member 35 provided in the casing 36 for supporting an annular elastic sealing member 34 which comes into contact with an outer peripheral surface of the refueling nozzle 33 while the refueling nozzle 33 is inserted.

The annular elastic sealing member 34 is formed of such a material as NBR (nitril rubber) or fluoro-rubber which exhibits oil resistance to a substance to be refueled, and the member 34 has an inner diameter D1 which is smaller than the outer diameter d1 of the refueling nozzle 33.

The seal supporting member 35 comprises a main body portion 35a to which the annular elastic sealing member 34 is heat-bonded, three engagement portions 35b engaging with the annular elastic sealing member 34, and a leg portion 35c fixed to the casing 36.

The casing 36 has a cylindrical shape and is mounted within the refueling pipe inlet portion 32. The casing 36 is in contact with a part of the annular elastic sealing member 34, whereby a cavity is defined between the casing 36 and the seal supporting member 35.

The above-described refueling nozzle sealing device, however, encounters the following problems.

Namely, because the outer diameter d1 of the refueling nozzle 33 is not constant and varies, it is required that sealing should be effected within a wide range covering every possible variation. However, if the inner diameter D1 of the annular elastic member 34 is made small, a combination with a refueling nozzle 33 of a certain type may result in that a large radial gap must be sealed; if such is the case, a large load is necessary during the insertion and removal of the refueling nozzle 33.

If the annular elastic sealing member 34 contacts with substance to be refueled and vapor of the substance, to become swollen therewith, since the amount of its swelling is greatly dependent on temperature, there is a risk that the above-mentioned radial gap that has to be sealed may change and cause a further increase in the load necessary during the insertion and removal of the refueling nozzle 33.

For the purpose of reducing the load necessary during the insertion and removal of the refueling nozzle 33, it is possible to reduce the coefficient of friction by coating PTFE (polytetrafluoroethylene) on the surface of the annular elastic sealing member 34. However, since the refueling nozzle 33 being inserted or removed not only slides on the surface of the annular elastic sealing member 34 but also applies a large load on the same surface with its leading end, there is a risk that such a PTFE coating may become peeled.

Another refueling opening sealing device is shown in FIG. 5, in which a nozzle guide member 37 is provided between a seal supporting member 35 and a annular elastic sealing member 34, that are such as those of the refueling opening sealing device shown in FIGS. 3 and 4.

With the above-described device, however, it is not possible to reduce the load necessary during the insertion and removal of the refueling nozzle 33, nor to solve problems concerning the wear resistance. Thus, the device shown in FIG. 5 encounters problems similar to those encountered by the device shown in FIGS. 3 and 4.

SUMMARY OF THE INVENTION

Accordingly, an object of the present invention is to provide a device for sealing a refueling opening, which is capable of positively preventing vapor of the substance to be refueled from dispersing into the air during a refueling operation.

Another object of the present invention is to provide a device for sealing a refueling opening, which ensures that the refueling nozzle can be inserted or removed always with a constant load even if there are variations in the outer diameter in the refueling nozzle and/or if the elastic member is swollen with substance to be refueled and vapor of the substance.

A further object of the present invention is to provide a device for sealing a refueling opening, which is capable of exhibiting an improved wear resistance even if a load is applied during the insertion and removal of the refueling nozzle.

According to the present invention, there is provided a refueling opening sealing device having an elastic sealing member which seals the gap between a tubular casing disposed in a refueling pipe and a refueling nozzle inserted into the casing during a refueling operation. The elastic sealing member allows part of liquid oil contained therein to exude to the surface thereof.

These and other objects, features and advantages of the invention will become clear from the following description of the preferred embodiment when the same is read in conjunction with the accompanying drawings.

BRIEF DESCRIPTION OF THE DRAWINGS

FIG. 1 is a sectional view of the sealing device, and FIG. 2 is a right side elevation of the sealing device shown in FIG. 1;

FIG. 3 is a sectional view of one conventional sealing device,

FIG. 4 is a right side elevation of the sealing device shown in FIG. 3, and

FIG. 5 is a sectional view of another conventional sealing device.

DESCRIPTION OF THE PREFERRED EMBODIMENT

Figure 1:
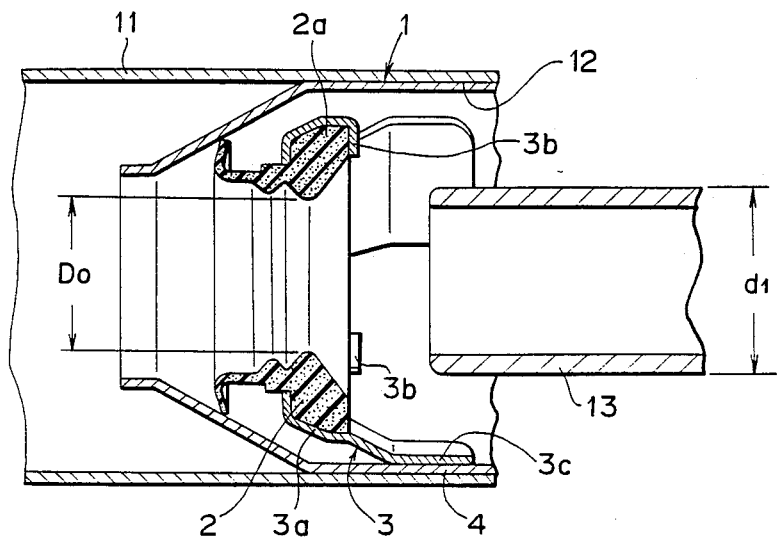
FIGS. 1 and 2 illustrate a refueling opening sealing device in accordance with one embodiment of the present invention, where
Figure 2:
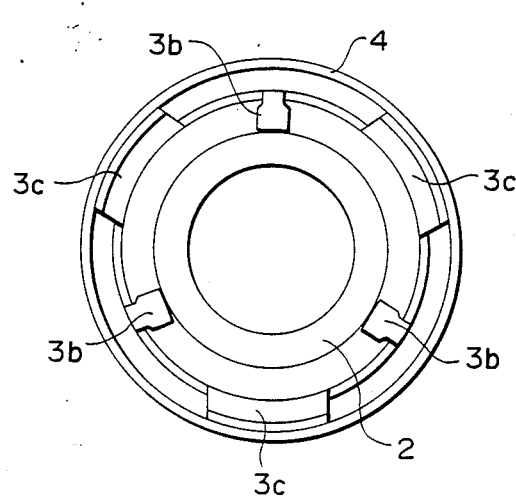
Figure 3:
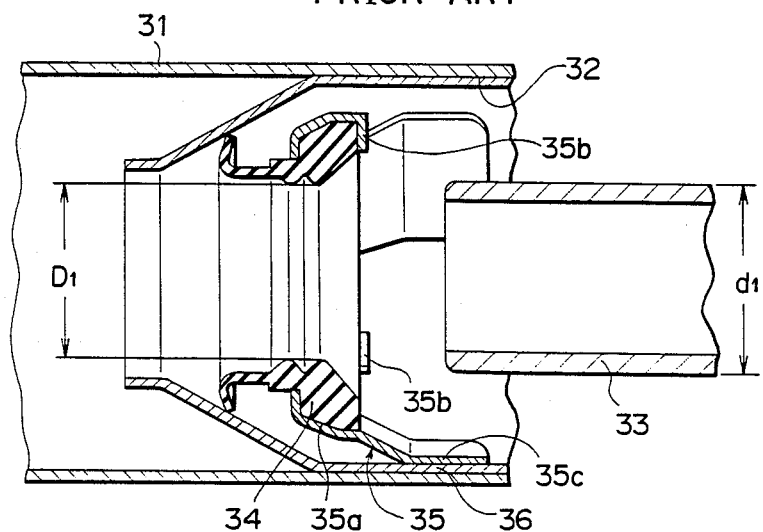
FIGS. 3 to 5 illustrate conventional refueling opening sealing devices, where
Figure 4:
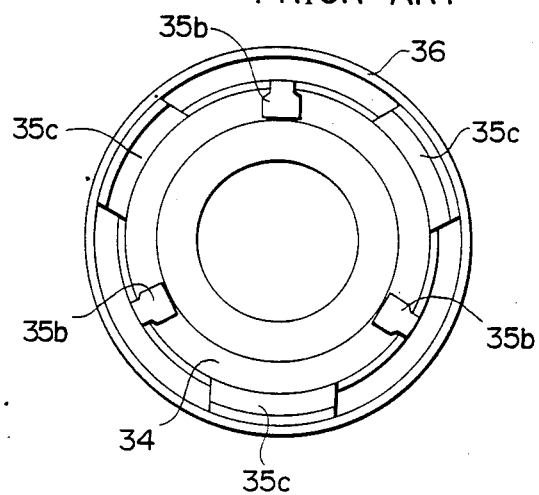
Figure 5:
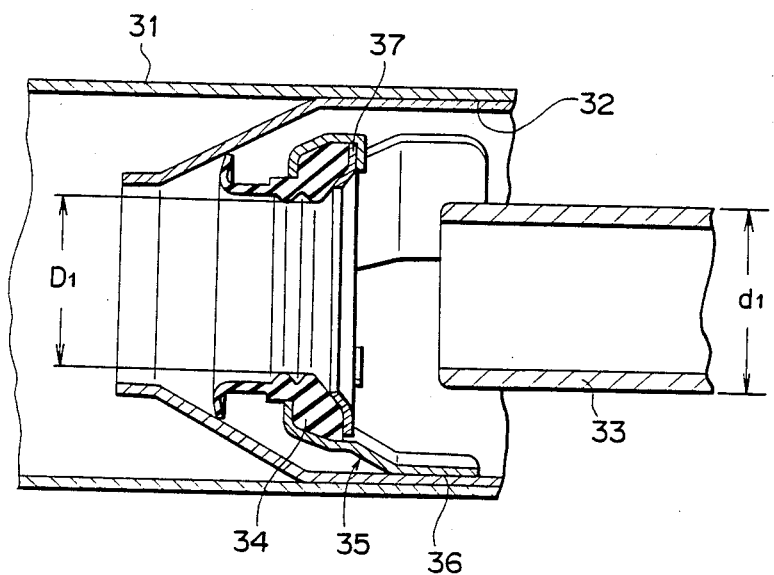

FIGS. 1 and 2 illustrate a refueling opening sealing device in accordance with one embodiment of the present invention. The sealing device has a tubular casing 4 disposed in a refueling pipe 11 that is connected to a fuel tank, not shown. The casing has an inclined tip portion. A seal supporting member 3 is mounted within the casing 4, with a leg portion 3a of the member 3 being fixed to the casing 4 and maintaining a certain space between other parts of the member 3 and the casing 4. An annular elastic sealing member 2 is disposed within the seal supporting member 3.

The elastic sealing member 2 has an inner diameter D0 which is smaller than the outer diameter d1 of a refueling nozzle 13. The leading end of the refueling nozzle 13 in the direction of insertion can be brought into contact with an inner surface of the casing 4.

The elastic sealing member 2 is formed by effecting vulcanization forming in such a manner that oil-impregnated porous particles 2a containing liquid oil are mixed into a rubber material having a fuel resistance, thereby loading the rubber material with these particles. The elastic sealing member 2 may be formed by, for instance, a method in which a vulcanization-formed mixture of rubber and porous particles is caused to contain liquid oil by a dipping or spraying process, or a method in which a mixture of rubber and porous particles which have previously been impregnated with oil is subjected to vulcanization forming. By using either of these methods, rubber and porous particles can be smoothly kneaded, thereby allowing the liquid-oil-containing oil-impregnated porous particles 2a to be mixed into the rubber material, thereby loading the rubber with the particles.

Materials which can be used as the fuel-resistant rubber are natural rubber and synthetic rubbers such as BSR (butadiene-styrene rubber). NBR (nitril rubber). butyl rubber, hydrin rubber. EPDM (ethylene-propylene rubber). chloroprene rubber, acrylic rubber, and fluoro-rubber.

Materials which can be used as the porous particles are such inorganic materials as $SiO_2$-based micro porous beads and diatomaceous earth.

$SiO_2$-based micro porous beads which can be used have an average particle size of 1 to 1000 μm, a pore diameter of 3 to 8000 Å, and a pore volume of 0.2 to 2.2 ml/g, and also have a spherical or indefinite shape.

Diatomaceous earth which can be used has an average particle size of 1 to 10 μm, an oil content of about 100 to 200 ml/100 g, and a bulk density of about 0.4 to 0.8 g/cc.

Usable examples of the liquid oil include silicone oil, fluorine-contained oil, brake oil, engine oil, transmission oil, refrigerating machine oil, gear oil, anti-freeze, and ether- or ester-plasticizers, which have a kinematic viscosity (at 40° C.) of about 1 to 10000 Cst, preferably about 1 to 1000 Cst, and a boiling point of about 25° to 500° C., preferably about 200° to 500° C.

The liquid oil is caused to be contained in the porous particles either before or after the vulcanization-forming. Part of the liquid oil contained in the particles is allowed to exude to the surface of the vulcanization-formed annular elastic sealing member 2.

The annular elastic sealing member 2 is attached to the seal supporting member 3 by bonding and fixing the sealing member 2 to the inner peripheral surface of the supporting member 3.

With the sealing device having the above-described construction, the refueling nozzle 13 is inserted or removed while the nozzle 13 is being kept in close contact with the elastic sealing member 2. It is therefore possible to positively prevent vapor of the substance to be refueled from dispersing into the air.

Further, with the device of the present invention, part of the liquid oil, such as silicone oil, in the porous particles is allowed to exude to the surface of the elastic sealing member 2. By virtue of this arrangement, the load required during the insertion or removal of the refueling nozzle 13 is reduced. At this time, even if the elastic sealing member per se is already swollen with the substance to be refueled and/or if there is a variation in the outer diameter of the refueling nozzle 13, the insertion or removal of the refueling nozzle 13 can be smoothly performed.

Further, since the elastic sealing member 2 is formed by effecting vulcanization forming in such a manner that oil-impregnated porous particles 2a containing liquid oil are mixed into the fuel-resistant rubber material, thereby loading the rubber material with the particles 2a, the liquid oil exists not only on the surface of the elastic sealing member 2 but also in other parts of the member 2, that is, the liquid oil exists in the elastic sealing member 2 in a three-dimensional manner. As a result, even when the part of the liquid oil that is on the surface of the elastic sealing member 2 has diminished, other parts of the liquid oil exudes from the inside to serve as a supplement, thereby enabling friction during the insertion and removal of the refueling nozzle 13 to remain at a low level for a long time, and thus ensuring improvement in durability.

What is claimed is:

1. A refueling opening sealing device for providing a seal between a tubular casing disposed in a refueling pipe and a refueling nozzle inserted into said casing, comprising:
 a seal supporting member mounted in said casing through legs; and
 an elastic sealing member supported by said seal supporting member, said elastic sealing member comprising a material containing liquid-oil-containing porous particles mixed therein so as to allow a liquid oil to exude to a surface of said elastic sealing member, said material being different than a material of said porous particles, and having a seal lip portion of a diameter smaller than an outside diameter of said refueling nozzle so as to contact an outer peripheral surface of said refueling nozzle to thereby provide a seal.

2. The refueling opening sealing device of claim 1, wherein said material is rubber.

3. The refueling opening sealing device of claim 1, wherein said porous particles are selected from the group consisting of $SiO_2$ based microporous beads and diatomaceous earth.

4. A refueling opening sealing device for providing a seal between a tubular casing disposed in a refueling pipe and a refueling nozzle inserted into said casing, comprising:
 a seal supporting member mounted in said casing through said supporting legs; and
 an elastic sealing member supported by said seal supporting member, said elastic sealing member being of a material containing liquid-oil-containing porous particles which allow a liquid-oil to exude to a surface of said elastic sealing member, said material being different than a material of said porous particles, and having a first annular seal lip portion of a diameter smaller than an outside diameter of said refueling nozzle and a second annular seal lip portion of a diameter larger than said first annular seal lip portion, said first and second seal lip portions providing said seal between said tubular casing and said refueling nozzle.

* * * * *